United States Patent [19]

Kwun et al.

[11] Patent Number: 5,331,239
[45] Date of Patent: Jul. 19, 1994

[54] INVERTER INTEGRAL TYPE MOTOR

[75] Inventors: Seung G. Kwun; Seung K. Jeong; Jim S. Park; Jae Y. Choe, all of Seoul, Rep. of Korea

[73] Assignee: Goldstar Co., Ltd., Seoul, Rep. of Korea

[21] Appl. No.: 993,272

[22] Filed: Dec. 18, 1992

[30] Foreign Application Priority Data

Dec. 20, 1991 [KR] Rep. of Korea .................. 23683
Dec. 30, 1991 [KR] Rep. of Korea .................. 24985

[51] Int. Cl.⁵ .................. H02K 11/00; H02K 5/00
[52] U.S. Cl. .................. 310/68 R; 310/89; 318/254
[58] Field of Search .................. 310/52, 59, 62, 63, 310/68 R, 89, 91, 160, 161; 318/254, 439

[56] References Cited

U.S. PATENT DOCUMENTS

| | | | |
|---|---|---|---|
| 3,787,014 | 1/1974 | Story et al. | 310/91 |
| 4,668,898 | 5/1987 | Harms et al. | 310/68 R |
| 4,758,768 | 7/1988 | Hendricks et al. | 318/254 |
| 5,006,744 | 4/1991 | Archer et al. | 310/89 |

*Primary Examiner*—Emanuel T. Voeltz
*Assistant Examiner*—Matthew Nguyen
*Attorney, Agent, or Firm*—Morgan & Finnegan

[57] ABSTRACT

An inverter integral type motor which is fixed with radiator board formed with a plurality of radiating fins at bottom of the inverter, and both side walls of the radiator board are fixed to both side surfaces of the motor main body. Thereby the motor main body and the inverter are integrally structured. Rubber absorbers are respectively interposed between both side walls of the radiator board and the fixing bosses formed at both side surfaces of load side and non-load side of the motor main body.

7 Claims, 5 Drawing Sheets

INVERTER INTEGRAL TYPE MOTOR

FIELD OF THE INVENTION

The present invention relates to an inverter integral type motor, and more particularly to an inverter integral type motor attaching an inverter to a motor to be integral thereby the entire structure compact.

BACKGROUND OF THE INVENTION

A general motor is made as shown in FIG. 1 and FIG. 2 with a structure in which a motor main body 1 and an inverter 2 are respectively separated, and the motor main body 1 and the inverter 2 are connected by electrical wires so as to be electrically connected which is not shown in the drawings.

A volume knob 3 for adjusting a frequency is provided to the inverter 2, and when the frequency is adjusted by utilizing the volume knob 3, a voltage is applied to the motor main body 1 side through lead wires (not shown) within a motor terminal box 4 which are connected with electrical wires connecting the motor main body 1 and the inverter 2, so that a rotor 5 rotates at a speed corresponding to the respective voltage and frequency in accordance with a rotating principle of a normal induction motor.

In the drawings, unexplained reference numeral symbol 6 represents a rotary shaft, numeral 7 represents a stator, and numeral 8 depicts an inputting electric power connecting means.

However, as described above, since a general motor is divided respectively into the motor main body 1 and the inverter 2, a very long electrically wire is required for connecting these, and there has been a disadvantage in that not only their storing was not easy but also a disposal of electric wires was not easy. In the case of mounting the inverter 2 to the motor main body, a magnetic noise and vibration of the inverter 2 itself was generated at low rotational speed, i.e., low frequency region, and a respective separate fan for cooling the motor and inverter and fan motor for driving this had to be provided. Accordingly not only much space was required but also their constitution was complicated and much trouble arose from this arrangement.

SUMMARY OF THE INVENTION

It is an object of the present invention to provide an inverter integral type motor having a compact structure by integrally constructing an inverter with a motor.

Another object of the present invention is to provide an inverter integral type motor capable of cooling simultaneously a motor and an inverter by a driving of one cooling fan.

In order to accomplish the above objects, the inverter integral type motor of the present invention is characterized by fixing a radiator board formed with several numbers of radiating fins at the bottom portion of the inverter, fixing both side walls of the radiator board to both sides of the motor main body, and constructing the inverter integrally to the motor main body.

DETAILED DESCRIPTION OF THE PREFERRED EMBODIMENT

Figure 1:
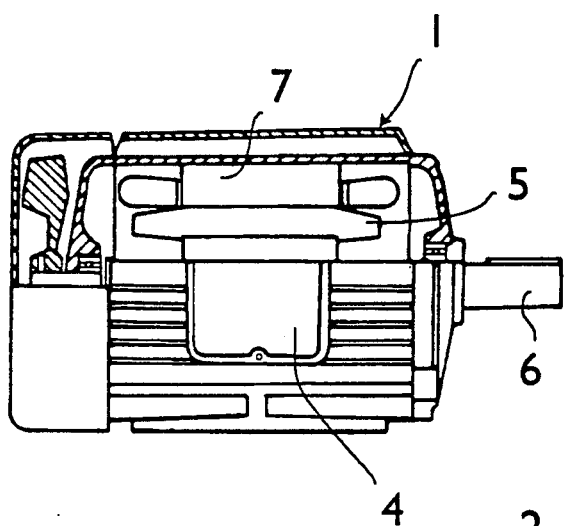
FIG. 1 is a half cross sectional view showing a structure of a general motor.
Figure 2:
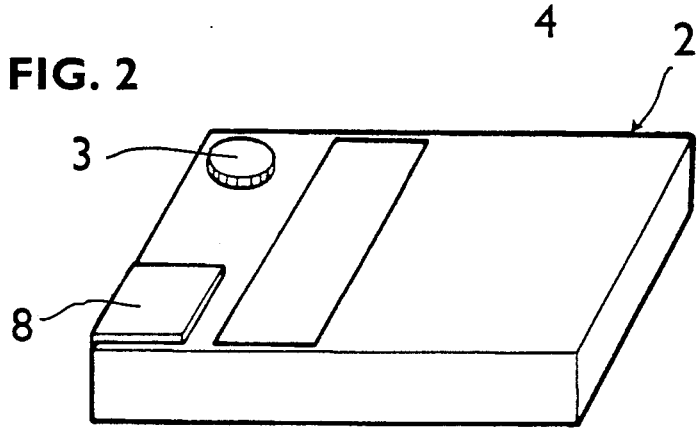
FIG. 2 is a perspective view of a general inverter.
Figure 3:
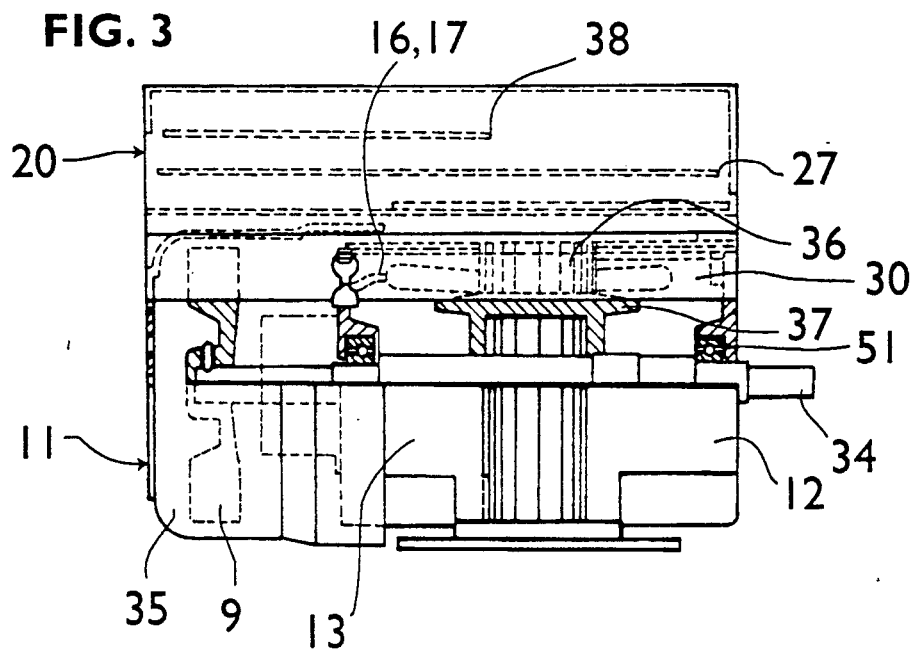
FIG. 3 is a partial cross sectional view showing a structure of an inverter integral type motor in accordance with the present invention.
Figure 4:
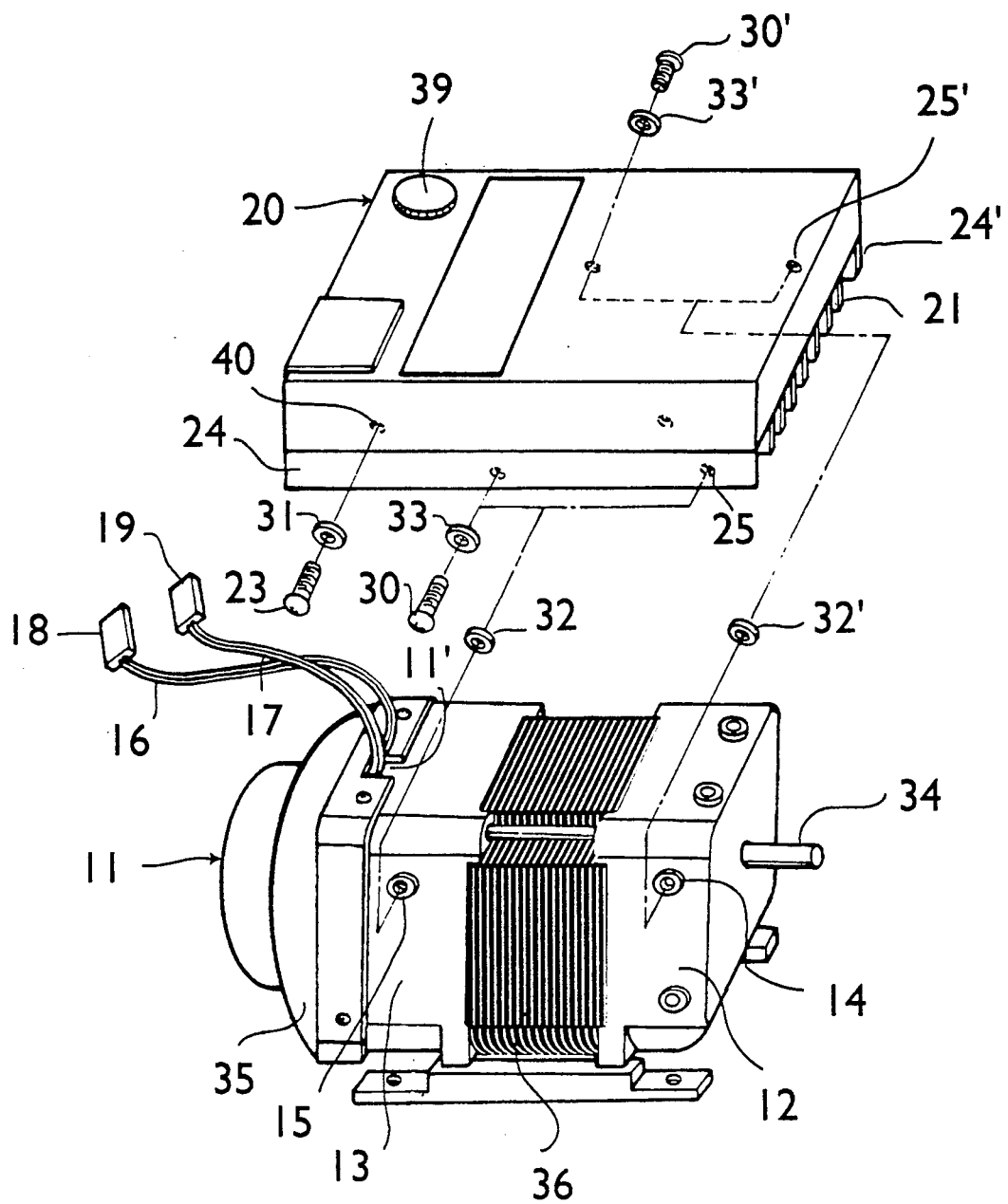
FIG. 4 is an exploded perspective view illustrating a structure of essential parts of the inverter integral type motor in accordance with the present invention.

An inverter integral type motor of the present invention is constructed as shown in FIG. 3 and FIG. 4 respectively by mounting an inverter 20 which controls the driving of said motor, on a motor main body 11. A fan cover 35 and a fan 9 are provided frontward of a driving shaft 34, a bearing 51 for supporting a stator 36 against a rotor 37 and brackets 12,13 for supporting a stator 36 are provided around the stator 36 rearward of fan 9.

Fixing bosses 14,15 of predetermined height are respectively formed at both side surfaces of a load side bracket 12 and non-load side bracket 13 of the motor main body 11, and motor main circuit lead wire 16 and capacitor lead wire 17 are respectively drawn from lead wire drawing out hole 11' of top surface, and connectors 18,19 are respectively connected at the end portions of the motor main body circuit lead wire 16 and capacitor lead wire 17.

On the other hand, a radiator board 22 having several number of radiating fins 21 formed perpendicular thereto is fixed by fixing bolts 23,23' to the inverter 20 of the inverter integral type motor in accordance with the present invention, and screw insering holes 25,25' are respectively defined at both side walls 24,24' extended longer to a perpendicular direction parallel with the radiating fin 21 of the radiator board 22.

Figure 6:
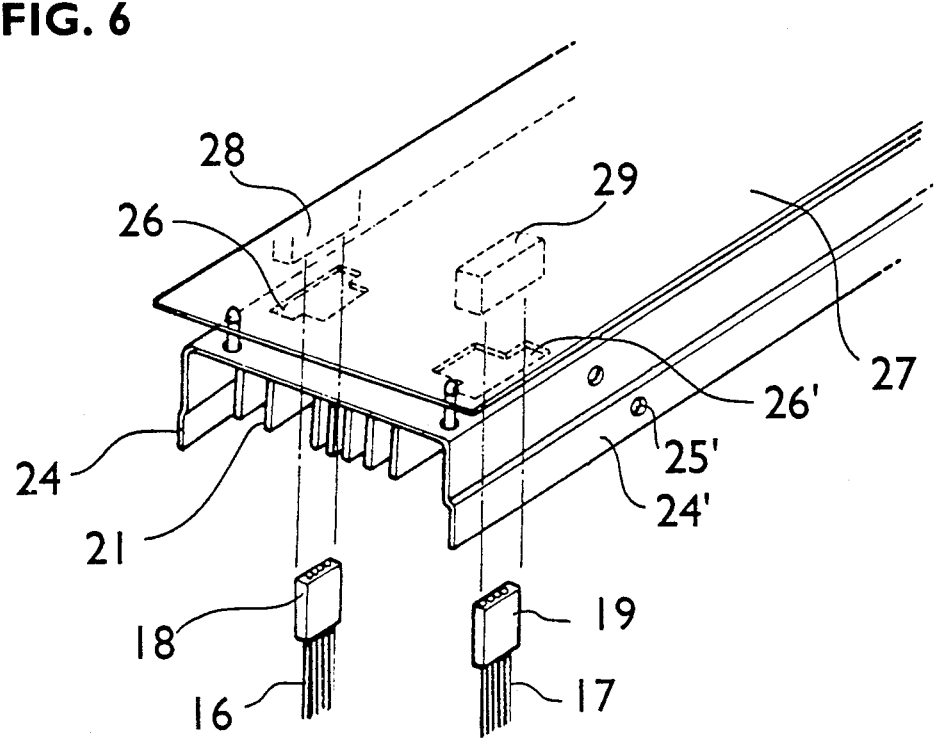
FIG. 6 is a fragmentary magnified perspective view illustrating a state for connecting the motor and the inverter in the inverter integral type motor in accordance with the present invention.

As shown in FIG. 6, slits 26,26' are respectively formed at both sides of said radiator board 22, and sockets 28,29 are respectively fixed at both sides of the bottom of a primary stair base board 27 structuring the inverter 20, so that connectors 18,19 of main circuit lead wire 16 of the motor main body 11 and capacitor lead wire 17 are connected and fixed through the slits 26,26'.

As described above, the side walls 24,24' of the radiator board 22 fixed to the inverter 20, are fixed to the motor main body 11 by fixing bolts 30,30' through the screw holes 25,25'. Washers 31,31' are interposed between the inverter 20 and the fixing bolt 23 for fixing the radiator board 22 to the inverter 20, and rubber absorbers 32,32' are respectively interposed between both side walls 24,24' of the radiator board 22 and the fixing bosses 14,15 of the motor main body 11 for a resilient coupling, and washers 33,33' are respectively interposed between the fixing bolts 30,30' for fixing the radiator board 22 and the side walls 24,24' of the radiator 22.

In the drawings, unexplained reference numeral symbol 38 represents a secondary stair base board, numeral 39 depicts a volume knob, and numeral 40 shows a screw tightening hole.

Figure 5:
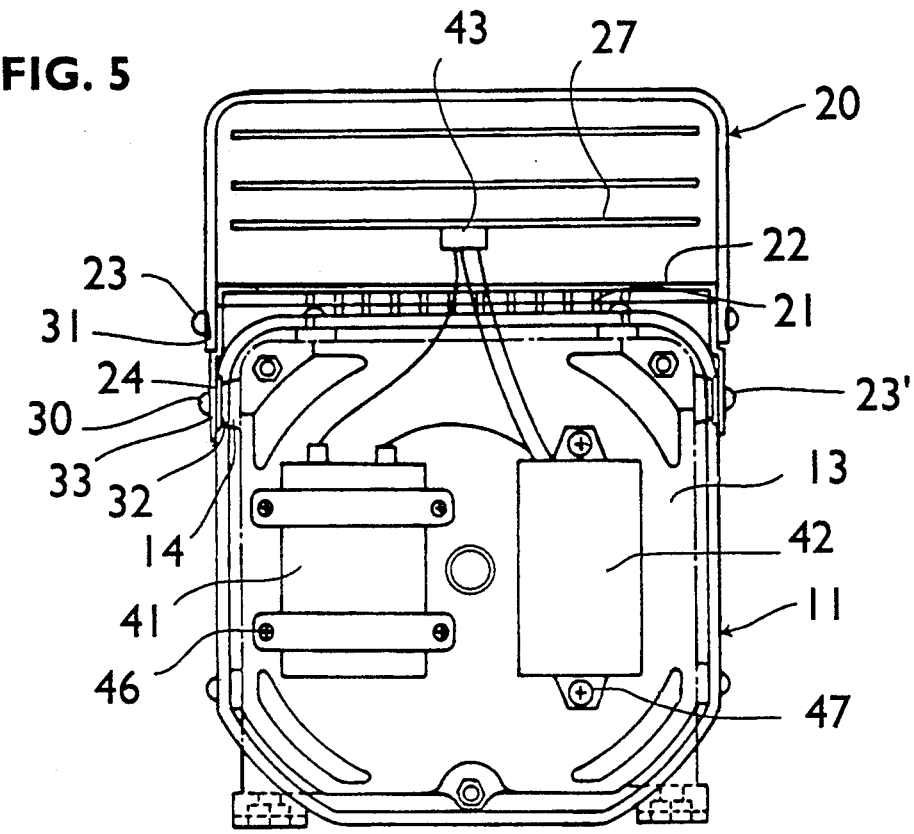
FIG. 5 is a side view showing electrical lead connecting state of the motor and the inverter of the inverter integral type motor in accordance with the present invention when the fan cover is taken away.

As shown in FIG. 5, the motor main body 11 has a hexahedron body shape so as to be easily connected with the inverter 20, a capacitor 41 used for filtering at direct link stage of the inverter 20 and a discharging resistor 42 for discharging an induced voltage upon reducing the speed are firmly fixed on the outside surface of the non-load side, the filtering capacitor 41 and the discharging resistor 42 are connected to the base board 27 of the inverter 20 via connector 43.

Figure 7:
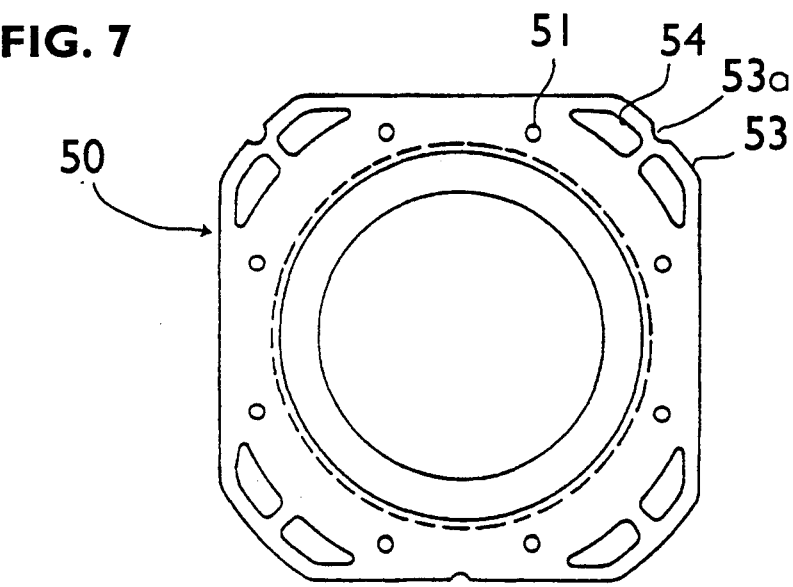
FIG. 7 is a front view illustrating a structure of a stator core of the inverter integral type motor in accordance with the present invention.
Figure 8:
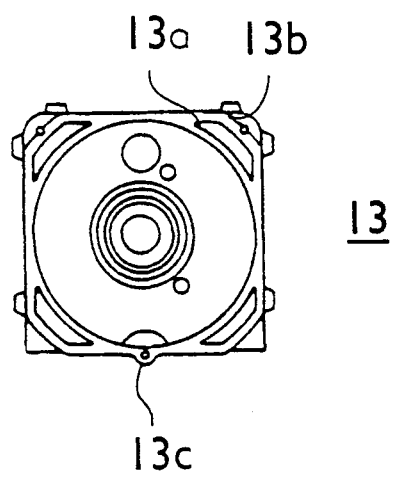
FIG. 8 is a front view illustrating a structure of a bracket of the inverter integral type motor in accordance with the present invention.

As shown in FIG. 7, stator core 50 in accordance with the present invention includes cogging holes 51 for piling the stator core, and ventilation holes 54 for cooling are formed to each corner portion. A rounding-processed bracket fixing surface 53 and screw passing through holes 52,53a for assembling the brackets 12,13 are formed to the corner surface. An embodiment is shown in which the passing through holes 53a of semi-spherical shape are formed on the rounding-processed two brackets' fixing surface and the passing through hole 52 of semispherical shape is also formed to the bottom end portion. Brackets 12,13 to be fixed with the stator core 50 are made to be able to insert said stator core, as shown in FIG. 8, owing to the core fixing surface 13b to accommodate the bracket fixing surface 53 of the stator core 50 is rounding-processed for the corner portion of the brackets 12,13. That is, the core fixing surface 13b for receiving the bracket fixing surface 53 is formed by protruding at four corner portions of the bracket 13, so that the core can be inserted and coupled to inside of the corner. Ventilation holes for cooling are formed at each corner of the bracket 13.

Explaining the operation and effect of the inverter integral type motor in accordance with the present invention constructed as described above, it will be as follows.

Firstly, in a state that the radiator board 22 is fixed to the inverter 20 by the several number of fixing bolts 23,23', as shown in FIG. 5 and FIG. 6, the connectors 18,19 connected to the end of the motor main circuit lead wire 16 and the capacitor lead wire 17 of the motor main body 11 are assembled, and thereby the motor main body 11 and the inverter 20 are electrically coupled and thereafter, the radiator board 22 is fixed to the motor main body 11 by several number of fixing bolts 30,30', so that the assembling is completed.

Thus, according to the inverter fixing device of the inverter integral type motor in accordance with the present invention which has completed the assembling, when the frequency is adjusted by utilizing a volume knob 39 of the inverter 20 fixed to top of the motor main body 11, since the motor main body 11 and the inverter 20 are connected by the electrically connecting structure as shown in FIG. 6, the voltage is applied to the motor main body 11 side and thereby the rotor 34 is rotated at a speed corresponding to respective voltage and frequency in accordance with the rotation principle of normal induction motor.

At this moment, since the radiator board 22 is fixed to the bottom of the inverter 20, the heat generated from the motor main body 11 can be effectively isolated by the radiating fins 21 of the radiator board 22, and since the rubber absorbers 32,32' are respectively interposed between the both side walls 24,24' of the radiator board 22, vibration and noise are absorbed.

Figure 9:
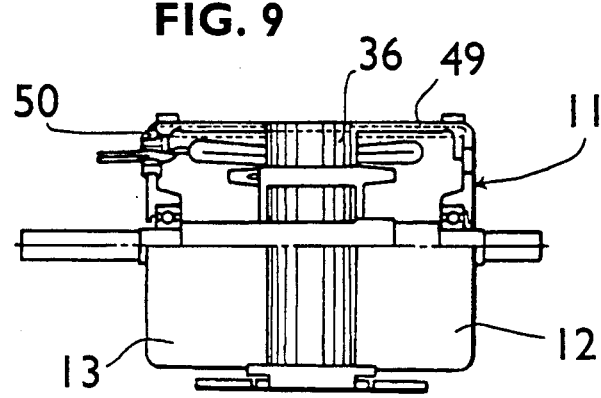
FIG. 9 is a diagram showing an assembled state of brackets of the inverter integral type motor in accordance with the present invention.

A structure for fixing the stator core 50 and the bracket 13 will be described by referring FIG. 7 to FIG. 9. In case of assembling the motor of the present invention, in order to reduce an air gap imbalance, the piling of the core 50 is carried out by cogging via the cogging hole 51 defined to the core, and the bracket fixing surface 53 is inserted to the corresponding surface of the bracket 13, i.e., the fixing surface 13b and then assembled by bolt 49 and the nut 50' through the passing through hole 25c of the bracket 13 and the screw passing through hole 53a of the core 51 and thereby the brackets 13,14 and the stator 36' are fixed. Accordingly, air tolerance is administrated by the core fixing surface 13b of the bracket and the bracket fixing surface 53 of the core 50, and since the nut 49 serves only a fuction of position determining of the stator core 50 and the brackets 12,13, it is possible also to form the screw passing through hole 13c to a semi-spherical shape in a time of core designing, and since it is sufficient by minimum three, influence affecting the magnetic circuit of the stator can be minimized.

Figure 10:
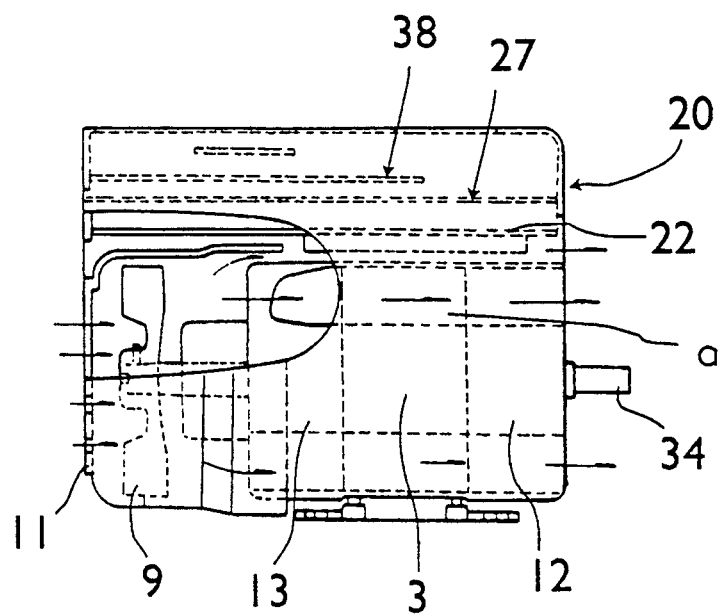
FIG. 10 is a diagram illustrating a flow of cooling air of the inverter integral type motor in accordance with the present invention.

The ventilation structure for cooling the inverter integral type motor of the present invention is shown in FIG. 10. The air entering through the fan cover 35 by the rotation of the fan 9 driven by the driving shaft 34 cools the filtering capacitor 41 and the discharging resistor 42 fixed to the non-load side bracket 13 of rearward of fan 9, and thereafter one part flows along the path (a) which' passes brackets 12,13 and core 50 through the ventilation hole 54 of the stator core 50 and the ventilation hole 13a of the bracket 13 and then flows rearward of the motor, and one part flows to above the brackets 12,13. Accordingly, as shown in FIG. 9, the air flowing to above the brackets 12,13 comes into contact with each radiating fin 21 of the radiator board 22 located at the bottom end portion of the base board 27, and thereby achieves a cooling effect and finally it is discharged to rearward of the motor, As described above, in accordance with the present invention, the inverter is fixed by the fixing bolts to the top of the motor main body, the radiator board is interposed between the motor main body and the inverter, and the rubber absorbers are respectively interposed to the fixing bolts for fixing the radiator board, so that noise and vibration are prevented. Temperature rising is also prevented and simultaneously the inverter can be integrally fixed to the motor main body. According to this, not only are conveyance and storage of the motor are readily done but also disposal of electric wires are more easily made.

It also has the advantage that the inverter and the motor can be simultaneously cooled by the fan 9 which is driven by the driving shaft 34.

Further, a cooling effect of the inverter and the motor can be effectively attained by pertinently adjusting a space between the fan cover 35 and external surface of the bracket 13, the path(a) between the core 50 and brackets 12,13, and magnitude of the radiator board 22. Even in a separate fan driven by a fan motor, the inverter and the motor can be simultaneously cooled by one fan in accordance with the aforementioned structure.

What is claimed is:

1. An inverter integral type motor, comprising:
    a rotor having a shaft including a shaft end;
    a stator core having first and second ends, a cylindrical hole receiving said rotor and a ventilation hole for cooling said stator core by air flow;
    first and second cup-shaped brackets holding said stator core at said first and second ends, said first and second brackets having respective first and second shaft holes through which said shaft is inserted for rotation, respective first and second openings corresponding to said ventilation hole, and a plurality of holes for bolt tightening said first and second brackets to said stator core;
    a fan fixed to said shaft end of said shaft, generating said air flow toward said stator core;
    a fan cover covering said fan and guiding said air flow into said ventilation hole and along a periphery of said first and second brackets, and said stator core;
    an inverter having a plurality of heat transfer fins transferring heat generated by said inverter using said air flow;
    a plurality of bosses formed on said first and second brackets, mounting said inverter and said fan cover; and
    means for connecting said inverter to said first and second brackets and said fan cover to one of said first and second brackets via said plurality of bosses.

2. The inverter integral type motor as claimed in claim 1, wherein said stator core is mode hexahedral providing said ventilation hole at each corner of said stator core and providing an easiness for mounting said inverter on top of said stator core to said first and second brackets.

3. The inverter integral type motor as claimed in claim 2, wherein said stator core is round-processed at each corner, and said first and second brackets have a projection at each corner between which said stator core fits.

4. The inverter integral type motor as claimed in claim 1, wherein said inverter includes a capacitor and a discharging resistor mounted at a bottom surface of said inverter.

5. The inverter integral type motor as claimed in claim 1, further comprising a resilient material interposed between said connecting means and said plurality of bosses of said first and second brackets corresponding to said connecting means.

6. The inverter integral type motor as claimed in claim 1, wherein said stator core has a plurality of cores stacked together.

7. An inverter integral type motor including a fan generating air flow, comprising:
    a rotor having a shaft including a shaft end;
    a stator core having first and second ends, a cylindrical hole receiving said rotor and a ventilation hole for cooling said stator core using said air flow;
    first and second brackets connected to said stator core at said first and second ends, said first and second brackets having respective first and second shaft holes through which said shaft is inserted for rotation, and respective first and second openings corresponding to said ventilation hole;
    an inverter mounted to said first and second brackets and having a plurality of heat transfer fins transferring heat generated by said inverter using said air flow.

* * * * *